United States Patent [19]

Himes

[11] 4,133,795
[45] Jan. 9, 1979

[54] CREPE SOLES
[75] Inventor: Glenn R. Himes, Houston, Tex.
[73] Assignee: Shell Oil Company, Houston, Tex.
[21] Appl. No.: 890,112
[22] Filed: Mar. 27, 1978
[51] Int. Cl.$^2$ ............................................... C08K 5/01
[52] U.S. Cl. ........................... 260/33.6 AQ; 36/32 R; 36/87; 260/42.47
[58] Field of Search ............ 260/33.6 AQ, 42.47, 260/892; 36/32 R, 84, 87, DIG. 2

[56] References Cited
U.S. PATENT DOCUMENTS

| | | | |
|---|---|---|---|
| 3,589,036 | 6/1971 | Hendricks et al. | 36/32 R |
| 3,614,836 | 10/1971 | Snyder et al. | 260/33.6 AQ |
| 4,049,595 | 9/1977 | Dominquez | 260/33.6 AQ |

Primary Examiner—Lewis T. Jacobs
Attorney, Agent, or Firm—Dean F. Vance

[57] ABSTRACT

A footwear composition having a simulated crepe appearance and possessing much improved cycle times is prepared by melt blending a monoalkenyl arene/diene block copolymer, oil, non-hygroscopic filler, crystal polystyrene, and synthetic fiber at a temperature below the melting point of the fiber. The synthetic fiber is preferably selected from the group consisting of polyamide fibers, polyester fibers, acrylic fibers, and mixtures thereof.

7 Claims, No Drawings

CREPE SOLES

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, inner-soles and the like. These compositions are disclosed in Hendricks et al, U.S. Pat. Re. No. 28,236. In general, these shoe component compositions usually comprise a mixture of block copolymer, extending oil, polystyrene and possibly a filler. For the most part, these block copolymers have proved to be particularly advantageous in many respects, including flexibility, processability, lack of vulcanization requirement and wet slip. However, in certain respects, short-comings have been noted. With respect to footwear, one of the major short-comings of the block copolymer compounds such as those referred to in U.S. Pat. Re. No. 28,236, is the long cycle time required to mold a shoe sole. Another shortcoming is unit sole blowing (steam bubbles), owing to steam generation during the injection molding process. Blowing increases cycle time because cooling time must be increased to permit bubble expansion to subside. Frequently, bubbles remain in the solidified unit sole. The void spaces present points of weakness within the sole. If it is desired to trim the sole, as in the case of unit sole blockers, to create different shoe sizes from one sole, the void spaces are laid open giving an unsightly and unacceptable sole. In addition, the prior art compounds are often difficult to remove from the molds and are prone to exhibit surface markings. A new composition has now been found that greatly reduces blowing and cycle time while retaining a crepe appearance and other good footwear properties.

SUMMARY OF THE INVENTION

The present invention is a composition suitable for footwear applications comprising:

(a) 100 parts by weight of a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8–65% by weight of the copolymer;

(b) about 5 to about 125 parts by weight of a crystal grade polystyrene;

(c) about 5 to about 175 parts by weight of a hydrocarbon extending oil;

(d) about 5 to about 150 parts by weight of a non-hygroscopic, finely divided filler; and (e) about 5 to about 50 parts by weight of a synthetic fiber selected from the group consisting of polyamide fibers, polyester fibers, acrylic fibers, and mixtures thereof;

wherein the various components are melt blended at a temperature below the melting point of said synthetic fiber.

These footwear compositions possess a crepe appearance, low moisture content, freedom from interior void spaces, easy demolding characteristics, good flex crack resistance, and good abrasion resistance. In addition, the cycle time required to mold a unit sole is about one-half of the time required for the typical prior art compound not containing a synthetic fiber.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Much preferred is a radial block copolymer. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as $A—B—(B—A)_n$ where n varies from 1 to 5. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 5,000 and about 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 30% and about 50% by weight. The general type and preparation of these block copolymers are described in U.S. Pat. Re. No. 28,236 and in many other U.S. and foreign patents.

The block copolymers useful in the compositions of this invention may also be hydrogenated either selectively, randomly or completely. Preferably, however, the block copolymers are not hydrogenated. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The polystyrene employed in the present formulations is termed "crystal grade polystyrene" as opposed to "high impact polystyrene". The term "high impact polystyrene" broadly comprises a major proportion of a styrene polymer, as herein defined, and as toughening agent an elastomeric polymer wherein the elastomeric polymer is present as discrete particles dispersed in a matrix of the styrene polymer. By "styrene polymer" or "crystal grade polystyrene" is meant any solid homopolymer or copolymer of styrene or a nuclear methyl substituted styrene having a softening point not less than 70° C. A preferred styrene polymer is polystyrene. Suitable copolymers can be obtained by copolymerizing styrene with other vinyl aromatic compounds such as ortho-, meta- or para-methyl styrene and 2,4-dichlorostyrene, or with comonomers which are not vinyl aromatic compounds such as acrylonitrile, methyl methacrylate, dimethyl itaconate and alpha-methyl styrene. Valuable compositions may also be derived from copolymers of ortho-, meta- or para-methyl styrene with copolymerizable monomers which are not vinyl aromatic compounds such as acrylonitrile, methyl methacrylate and dimethyl itaconate. In general, the comonomer is employed in a concentration of up to 40 percent by weight of the total monomers. High impact polystyrene (HIPS) is not preferred since the compositions with HIPS possessed greater puffing than those containing crystal polystyrene.

The amount of polystyrene employed in the compositions of the present invention varies from about 5 to about 125 phr, preferably about 20 to about 90 phr. The term "phr" is well known, and means parts by weight per 100 parts by weight rubber (or block copolymer as in the present case).

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, No's. 310, 371 and 311 (which is a blend of 310 and 371). The amount of extending oil employed varies from about 5-175 phr, preferably from about 80-130 phr.

The fillers employed in the present invention must be non-hygroscopic as opposed to hygroscopic fillers such as silicon dioxide. Suitable non-hygroscopic fillers include barium sulfate, calcium carbonate, talcs and some clays. Preferred fillers are barium sulfate and calcium carbonate. The amount of filler employed varies from about 5 to about 150 phr, preferably about 15 to about 50 phr. The filler performs a very useful purpose by dissipating heat. Without the filler the footwear compositions have high heat retention and consequently low tear strength at the resultant higher temperatures. Additional minor amounts of antioxidants, ultra violet stabilizers and the like may also be added.

In the prior art formulations, it had been necessary to use a hydrated silica to produce a unit sole having a crepe appearance. As noted above, the use of the hydrated silica resulted in numerous disadvantages. The present invention employs a synthetic fiber to give a crepe appearance as opposed to the use of hydrated silica.

The fibers employed in the present invention are selected from the group consisting of polyamide fibers, polyester fibers, acrylic fibers, and mixtures thereof. It has been found that non-synthetic fibers, such as rayon (regenerated cellulose) are not useful since their use results in poor appearance and excessive mold removal resistance. Likewise, Sisal (Jute) fiber was tried but had very poor heat stability. Polyamide fibers are the least desirable of the synthetic fibers since they are slightly hygroscopic. The most preferred fibers are blends of polyester and acrylic fibers such as a blend of Orlon and Dacron fibers.

The polyamide fibers used herein are either fibers of nylon-6 or nylon-6,6. Their preparation is disclosed in numerous patents and articles including U.S. Pat. Nos. 2,071,250; 2,071,253; 2,130,523; 2,130,948 and in the Kirk-Othmer Encyclopedia of Chemical Technology, Volume 16, pages 46-87 (2nd ed. 1968).

The polyester fibers employed are defined by the Federal Trade Commission as "a manufactured fiber in which the fiber forming substance is any long chain synthetic polymer composed of at least 85% by weight of an ester of a dihydric alcohol and terephthalic acid (p-HOOCC$_6$H$_4$COOH)". The most common polyester in use is that derived from poly(ethylene terephthalate) (PET):

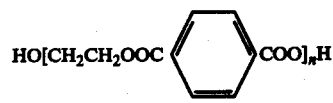

Commercial PET is available from DuPont under the tradename Dacron fiber. Another common polyester is poly(1,4-cyclohexylenedimethylene terephthalate), commercially available from Eastman Chemical under the tradename Kodel II:

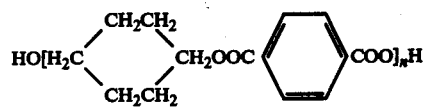

These polyester fibers are described in the Kirk-Othmer Encyclopedia of Chemical Technology, Volume 16, pages 143-159 (2nd ed. 1968).

The third type of fiber employed in the present invention is an acrylic fiber, defined by the Federal Trade Commission as a manufactured fiber "in which the fiber-forming substance is any long-chain synthetic polymer composed of at least 85% by weight of acrylonitrile units

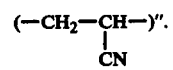

Typical acrylic fibers produced in the U.S. are Orlon (Du Pont), Acrilan (Chemstrand), Creslan (American Cyanamid), and Zefran (Dow). Fibers of 100% acrylonitrile are rarely used commercially, and usually acrylonitrile is copolymerized with at least one other monomer. Typical monomers copolymerizable with acrylonitrile are listed below:

1.

Hydrocarbons
styrene
alphamethylstyrene
isobutylene

2.

Alcohols
allyl alcohol
methallyl alcohol
alphahydroxymethylacrylonitrile
allyloxyethanol

3.

Ethers
vinyl methyl ether
allyl ethers of amino alcohols
vinyl ethers of amino alcohols
allyl glycidyl ether

4.

Halides
vinyl chloride
vinylidene chloride

5.

Amines
2-vinylpyridine
2-methyl-5-vinylpyridine
allyldimethylamine
2-vinylquinoline

6.

Amides
acrylamide
N-dimethylacrylamide
N-dimethylaminopropylacrylamide
N-(2-hydroxyethyl)acrylamide

7.

Acids (or their salts)
acrylic acid
methacrylic acid
itaconic acid
vinylbenzenesulfonic acid

8.

Ketones
vinyl methyl ketone
alphaacetoxystyrene

9.

Acrylates
methyl acrylate
methyl methacrylate
N-dimethylaminoethyl acrylate
methyl alphaacetaminoacrylate
methoxyethyl acrylate
methyl alphachloroacrylate

10.

Vinyl esters
vinyl acetate
vinyl chloroacetate

11.

Miscellaneous
allylpyridinium chloride
N-vinyl-N,O-diethylisourea
vinylidene cyanide The preparation of these fibers is described in the Kirk-Othmer Encyclopedia of Chemical Technology, Volume 1, pages 313–338 (2nd ed. 1963).

Fiber lengths are not critical. However, it is preferred that the fiber lengths be from about 500μ to about 5000μ. In addition, the fiber diameter, shape and nature of the fiber are of minor importance. In general, the fibers are employed in the structure and size resulting from their manufacturing process. In other words, it is possible to use commercially available fibers, if necessary after cutting to the desired length range.

The amount of synthetic fiber employed is from about 5 phr to about 50 phr, preferably about 5 phr to about 20 phr.

The components of this invention may be combined by processes known in the art including blending such as by various continuous mixers, extrusion, Banbury mixing or by dry-blending procedures. In the latter case, it is preferred that the block copolymer be formed or ground in particles having an average size less than about 4 millimeter diameter into which the extending oil is absorbed. Following this, the remaining powdered components may be added and vigorously dry-blended therewith such as in well-known dry-blending equipment long used in the PVC dry-blending art.

In order to produce unit soles having a crepe appearance it is necessary that the various components be blended together at temperatures below the melting point of the fibers. The preferred blending temperature range is about 250° F. to about 475° F., preferably about 280° F. to about 400° F.

The use of the present composition in footwear includes especially their use in soling when prepared by injection molding and slab soling, such as produced by cutting shoe sole forms from extruded slab-stock. The advantages of the present compositions are most apparent in injection molding of unit soles which are later attached by adhesion or sewing to uppers. In this situation, it has been found that the unit soles are readily removed from the injection mold and have reduced weld line formation on the surface. Furthermore, the sole so produced is resistant to delamination and is manufactured with a relatively short cycle time in the mold. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, various compositions were prepared using both crystal grade polystyrene and high impact polystyrene. In compounds 2–6, the block copolymer was a styrene-butadiene branched block copolymer (KRATON® 4140 Thermoplastic Rubber). In compound 1 the block copolymer was a linear styrene-butadiene block copolymer (4122). In each compound, the extending oil was a paraffinic oil (SHELLFLEX® 311) and the same additive package was included. The polyester/acrylic fiber blend was No. 45 Orlon-Dacron Flock from Akron Chemical Company.

The individual components were mixed on a Banbury Mixer at about 300° F. for about 2 to 5 minutes. Samples of the various compositions were tested according to the following tests:

| Test | Standard Test Number |
|---|---|
| Tinius Olsen Stiffness | D-747 |
| Taber Abrasion | D-1044 |
| Ross cut growth | D-1052 |

In addition, the various compositions were used in the injection molding of unit soles in a unit sole mold attached to a Desma rotating table and injection molded by a Monopak molding machine. The pulling force required to remove the unit soles from the mold and the cycle time required were noted for various compositions. The cycle time was the time required to permit demolding from men's size 8 unit sole mold, after injection from Monopak barrel at 380° F., without sole tearing, distortion or excessive porosity.

The various formulations and test results are presented below in Table I.

Table I

| Composition (Parts by Weight) | 1 | 2 | 3 | 4 | 5 | 6 |
|---|---|---|---|---|---|---|
| Block Copolymer | 100 | 100 | 100 | 100 | 100 | 100 |
| Extending Oil | 112 | 119 | 111 | 111 | 111 | 111 |
| Crystal Polystyrene | 36 | — | 53 | — | 53 | 53 |
| High Impact Polystyrene | — | 53 | — | 53 | — | — |
| Poly(alphamethyl styrene) | 17 | 5 | 5 | 5 | 5 | 5 |
| Hydrated Silica | 27 | 13 | — | — | — | — |
| Calcium Carbonate | — | — | 25 | — | — | 25 |
| Barium Sulfate | — | 13 | — | 25 | 25 | — |
| Nylon Flock | — | 10 | — | — | — | — |
| Polyester/Acrylic Fiber Blend | — | — | — | 10 | 10 | 10 |
| Test Results | | | | | | |
| Minimum In-Mold Cooling Time, Seconds | 50 | 75/45 | 70 | 60 | 45 | 35 |
| Demolding Force at Minimum Cooling Time, lbs. | 7.8 | 7.5 | 14 | 10 | 9.4 | 7.4 |
| Initial Moisture Content, % | 0.34 | 0.24 | 0.02 | 0.05 | 0.06 | 0.07 |
| Moisture Content after 3 days, % | 0.60 | 0.37 | 0.02 | 0.16 | 0.11 | 0.07 |
| Tinius Olsen Stiffness, psi | 920 | 720 | 1800 | 910 | 840 | 1050 |
| Ross Flex Crack Resistance, Kc to 500% Cut Growth | 520 | 700 | 440 | 620 | 530 | 740 |
| Taber Abrasion Loss, cm$^3$/Kc | 0.82 | 0.85 | 0.62 | 0.78 | 0.66 | 0.73 |
| Appearance | Crepe | Crepe | Non-Crepe, Surface Defects | Crepe | Crepe | Crepe |

What is claimed is:

1. A footwear composition having a simulated crepe appearance comprising:
   (a) 100 parts by weight of a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8-65% by weight of the copolymer;
   (b) about 5 to about 125 parts by weight of a crystal grade polystyrene;
   (c) about 5 to about 175 parts by weight of a hydrocarbon extending oil;
   (d) about 5 to about 150 parts by weight of a non-hygroscopic, finely divided filler; and
   (e) about 5 to about 50 parts by weight of a synthetic fiber selected from the group consisting of polyamide fibers, polyester fibers, acrylic fibers, and mixtures thereof;

wherein the various components are melt blended at a temperature below the melting point of said synthetic fiber.

2. A composition according to claim 1 wherein said block A is a polystyrene block and said block B is a polybutadiene block.

3. A composition according to claim 2 wherein said filler is calcium carbonate.

4. A composition according to claim 1 wherein said block copolymer is selectively hydrogenated such that no more than about 25% of the aromatic double bonds of block A are reduced by hydrogenation while at least 75% of the aliphatic double bonds of block B are reduced by hydrogenation.

5. A composition according to claim 1 wherein said synthetic fiber is a blend of a polyester fiber and an acrylic fiber.

6. A composition according to claim 1 wherein the components are blended together at a temperature between about 250° F. and about 475° F.

7. A shoe sole having the composition of claim 1.

* * * * *